March 27, 1928.  1,663,879
J. H. FAHR
GRAIN AND GRASS MOWING MACHINE
Filed June 21, 1923  5 Sheets-Sheet 2
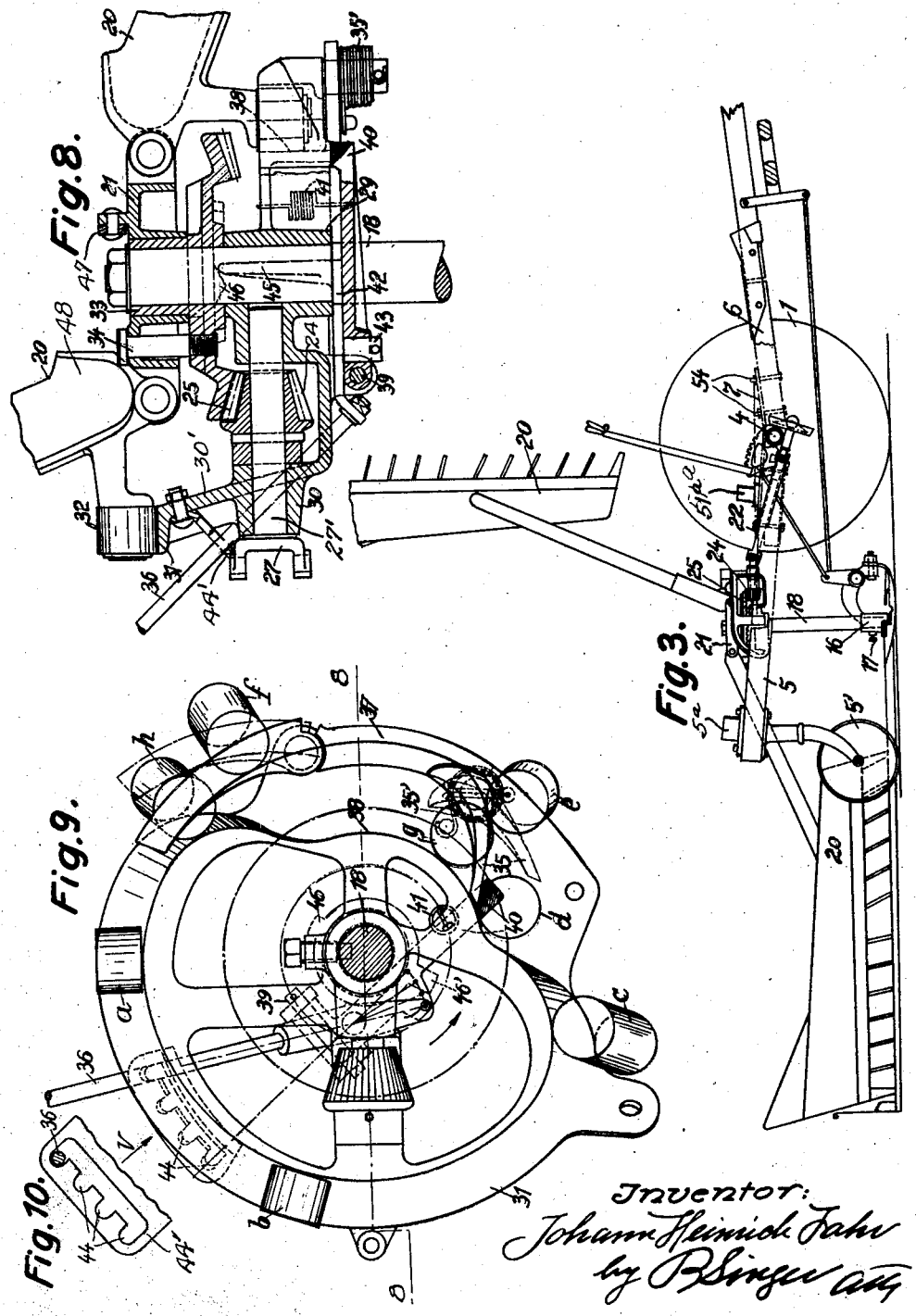

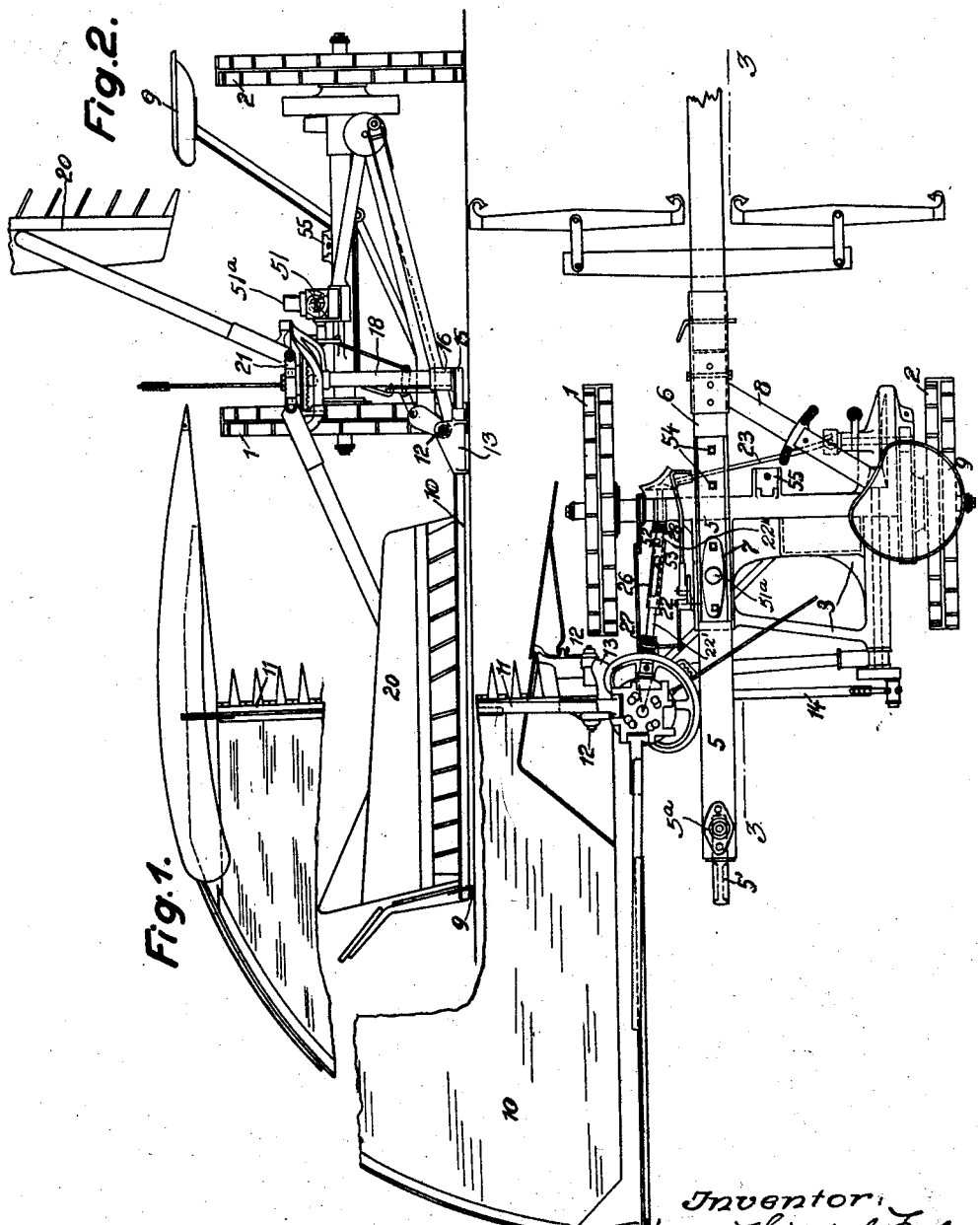

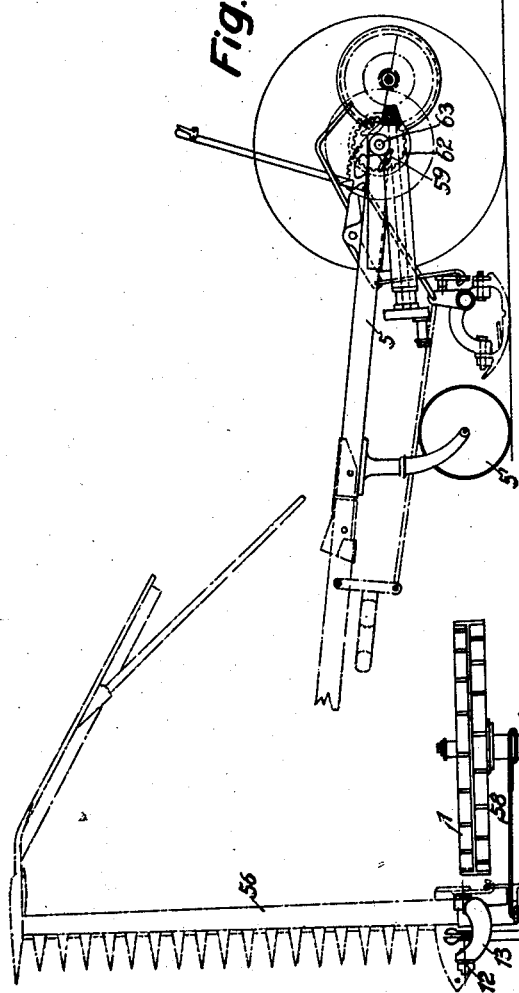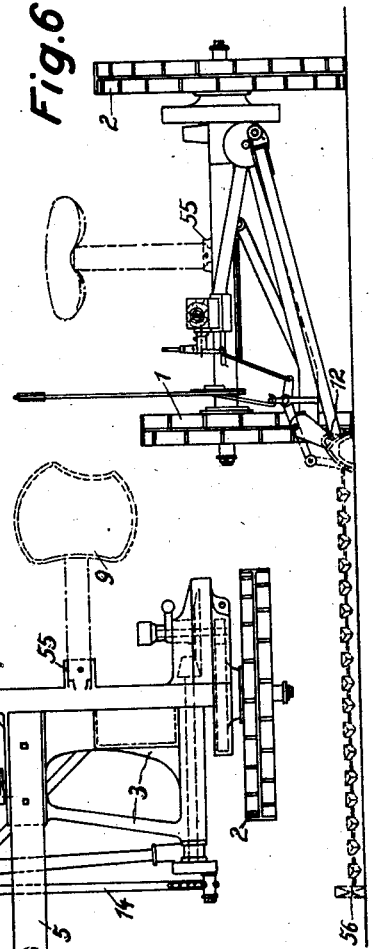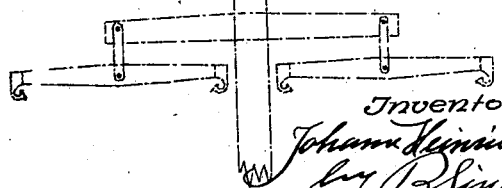

March 27, 1928.  1,663,879

J. H. FAHR

GRAIN AND GRASS MOWING MACHINE

Filed June 21, 1923    5 Sheets-Sheet 4

Inventor:
Johann Heinrich Fahr
by B. Singer Atty

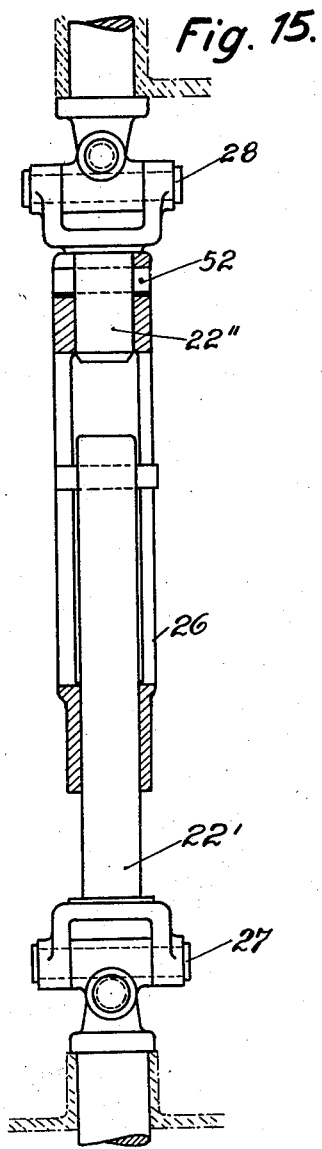
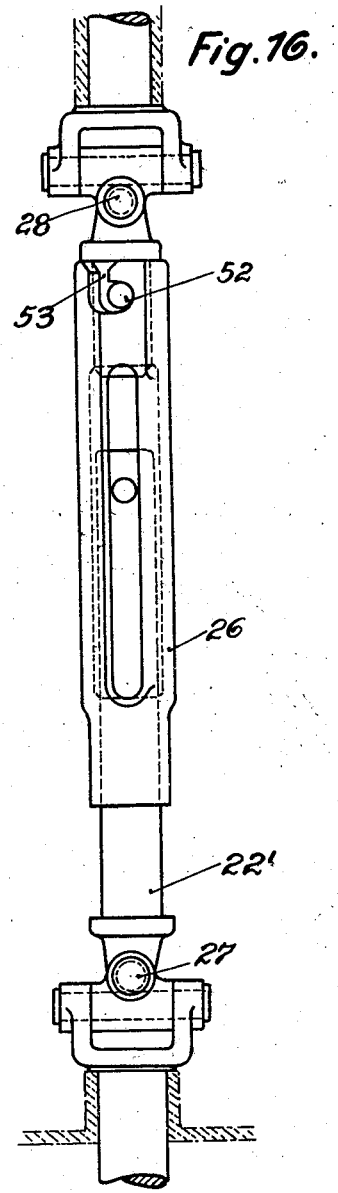

Patented Mar. 27, 1928.

1,663,879

UNITED STATES PATENT OFFICE.

JOHANN HEINRICH FAHR, OF STOCKACH IN BADEN, GERMANY.

GRAIN AND GRASS MOWING MACHINE.

Application filed June 21, 1923, Serial No. 646,889, and in Germany June 26, 1922.

This invention relates to grain-mowing machines constructed on the same lines as the ordinary grass-mowing machines in the form of a two-wheeled vehicle. An object of the invention is to provide machines of this kind in which the parts required for cutting grain, such as the grain delivering mechanism with its drive and the hinged grain platform, are built in such a manner that the manufacture, assembling and use of the machine is considerably simplified and improved in comparison with previous grain-cutting machines. Another object of the invention is to provide a machine which can be easily converted from a grain-mowing machine into a grass-mowing machine and vice versa.

The invention is shown by way of example in the drawing in which

Fig. 1 is a plan view of the machine as it appears when arranged to operate as a grain-mowing machine, Fig. 2 is a front view and Fig. 3 a side view partly in section on the line 3—3 of Fig. 1.

Figs. 4, 5 and 6 show similar views of the machine when converted into a grass-mowing machine.

Fig. 8 is a detail sectional view of the bar locking mechanism taken on the plane indicated by the line 8—8 of Fig. 9.

Fig. 9 is a detail plan of the same.

Fig. 10 shows a detail of the bar locking mechanism of Fig. 9 as seen in the direction of the arrow V.

Fig. 15 is a detail elevation partly in section of the shaft 22 and its connections.

Fig. 16 is an elevation of the same at right angles to Fig. 15.

Figure 13:
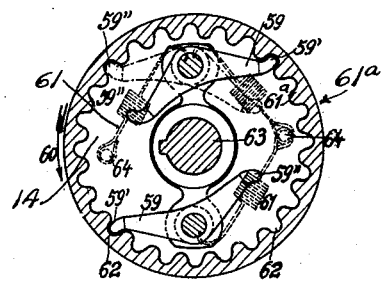
Fig. 13 is a detail horizontal sectional view of the gearing for transmitting rotary motion of a ground wheel to the driving shaft of the cutter mechanism and grain delivery mechanism, taken on the plane indicated by the line 13—13 of Fig. 14.

Figs. 1–4 show a vehicle provided with two wheels 1 and 2, a frame 3, an axle housing 4 and a shaft coupling beam 5 of the kind ordinarily used in grass-mowing machines. Connected to the shaft-coupling beam 5 by means of a flat bar 7 and bolts 54 is the shaft stump 6 which is here shown as provided with the usual double tree and single tree for the attachment of the draft animals. An arm 8 of the shaft stump 6 serves as a means for connecting the driver's seat 9. The grain platform 10 with the cutter bar 11 is pivotally connected to a coupling member 13 of the vehicle frame 3 by means of hinge bolts 12. The cutter bar is operated in the customary manner by means of a pitman drive 14. The platform 10 or platform support has a prolongation 15, Fig. 2, which extends beyond the hinged joint 12 and mounted upon this prolongation 15 is a sleeve 16 which is adapted to receive a vertical support 18 for the grain delivery mechanism. The vertical support is held against rotation by a screw 17, Fig. 3. Mounted at the top end of the vertical support 18 is the operating gear for the grain delivery mechanism. The weight of the support together with that of the grain delivery mechanism almost balances the weight of the platform 10 which can be made comparatively light. The outer or free end of the platform, instead of being supported in the usual manner by a wheel, runs on a shoe 9 (Fig. 2) which has only to take the slight overbalance of the platform, most of its weight being lifted by the grain delivery mechanism at the other side of the hinge 12, Fig. 1. The platform therefore swings up and down easily in conformity with unevenness of the ground and the entire machine can be turned and its motion reversed much more easily than if a supporting wheel is provided at the outer end of the platform which has to take the entire weight of the same. Thus by balancing the platform by the weight of the grain delivery mechanism at the other side of the hinge 12 the machine is made easier to control. The vertical support 18 with the grain delivery mechanism participates in all motions of the platform and no means for limiting the motion of the said mechanism relatively to the platform is necessary. The rakes 20 of the said mechanism brush past the platform irrespective of the position into which it may be swung.

Revolubly mounted at the top of the vertical support 18 is the rake revolving member or rake head 21 to which the ends of the rake bars 20 are pivotally connected. The rake head is revolved by means of bevel gears 24, 25 driven by a shaft 22 (Figs. 1 and 3) provided with universal joints 27 and 28, the shaft 22 being rotated by the driving shaft 23. The shaft 22 consists of two sections 22′ and 22″ joined together by means of a slotted sleeve 26 in which the shaft sections can move longitudinally relatively to each other so that the drive of the grain delivery mechanism can, by virtue of the sleeve joint 26 and the two universal joints 27, 28, readily adapt itself to all rocking movements of the platform and the support 18.

The grain delivery mechanism itself is constructed as follows: The bushing 29 is fixedly secured near the upper end of the post 18, Figs. 8 and 9, said bushing carrying a bearing 30 for the shaft 27′ of the universal joint 27 for the driving shaft 22. The said bushing also carries a cam 31 over which the rolls 32 travel imparting vertical swinging motion to the rakes 20. The rake head 21, which is rotated by the bevel gear 25, is mounted on the hub 33 of the bevel gear 25. The rake head 21 is, however, united with the bevel wheel 25 by means of bolts 34. The curved track or cam surface 31 is shaped in the usual manner so that the rakes are swung in such a way that they rake the grain entirely off the platform and are then swung upward. The usual rake deflecting member 35 (Fig. 9) is also provided by which, when the handle 36 is moved into certain positions, some of the rakes can be deflected, i. e. their swinging motions can be altered, in such a manner that they do not rake off the grain but travel at a certain height over the platform without touching it. To move the rakes in this manner the rake deflecting member 35 drives the rolls 32 onto a cam section 37, instead of allowing them to travel over the section 38 of the cam surface. The shape of the rake deflecting member or switch must be different from that of the usual type of switch employed in grain-cutting machines and must be adapted to the general arrangement of the novel machine. The switch 35 is normally kept in the position shown in Fig. 9 by dash and dot lines by means of a spring 35′. When the switch 35 is moved into its reversed position in the manner hereinafter described it is locked there by means of a hook 40 adapted to swing round a pivot 39. The hook 40 is pulled upward by a spring 41, Fig. 8. The hook 40 is connected to a horizontal extension 42 of a handle 36 which can be turned round a vertical pivot 43. The outer end of the handle can be moved into any one of a number of notches 44 shown more clearly in Fig. 10. The notch 44 in which the handle 36 is positioned determines which of the rakes will be deflected by the switch 35 so as to sweep over the grain platform without touching the grain. Fixed to the horizontal prolongation 42 of the rake controlling handle 36 is an upright wiper 45 which cooperates with cams 46, 46′ on the bottom surface of the hub of the gear 25. During the rotation of the rake head the wiper 45, and consequently the hook 40, is depressed once, twice, permanently, or not at all in one revolution according to the position into which the rake controlling handle 36 is set. Whenever the hook 40 is thus depressed it allows the switch 35 to be turned back by the spring 35′ into its normal position so that the next rake guiding roll 32 will pass onto the section 38 of the cam surface. When the roll has passed the forward end of the switch 35 it engages with its rear end and thus automatically throws the switch 35 back into the reversed position shown in full lines in Fig. 8 in which it is held by the hook 40. The roll of the next rake will then be deflected by the switch 35 from the normal track onto the section 37 of the cam surface, unless the hook 40 is again pressed down by a cam 46 cooperating with the wiper 45 before the roll reaches the switch 35. In Fig. 9 various positions of the rake guiding rolls on the cam track are shown. a and b show rolls on a section of the cam surface that lifts the rakes upwards, and the roll c has reached a section of the cam surface by which a rake is allowed to dip down towards the grain platform. When the roll has reached the position d it commences to travel on the switch 35, if this switch is in the reversed position, and then passes into the position e and thus reaches the side track 37 by which the rakes are held, while travelling over the platform, at a height in which they do not touch the grain. From the side track 37 the rolls pass from the position f to the position a in which the rakes are lifted into their highest position. If the hook 40 is depressed and the switch 35 caused to swing into its normal position immediately before a roll passes into the position d it will travel past the inside of the switch 35 onto the section 38 of the cam, and the rake is then allowed to dip down onto the platform sufficiently to rake the grain therefrom. From the position g in which the roll reverses the switch 35 it passes over the track section 38 into the position h and then again into the position a in which it raises the rake into its upmost position.

Figure 7:
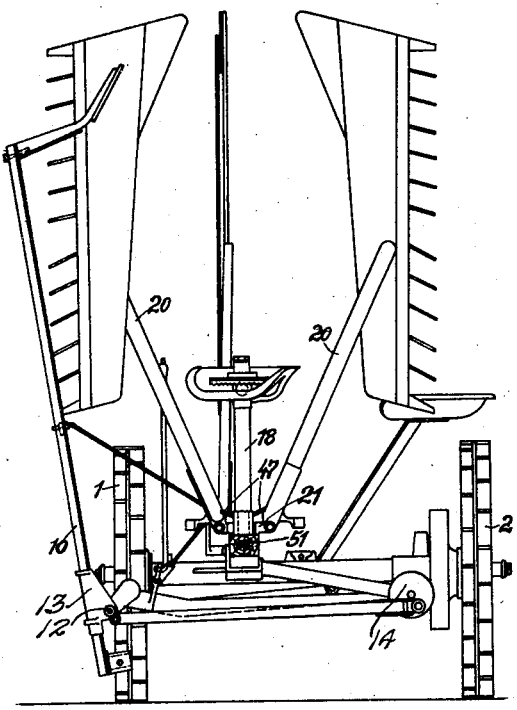
Fig. 7 is a front view of the grain-mowing machine with its parts in their non-operative positions, i. e. the positions that they assume when the machine is being moved from one place to another.
Figure 12:
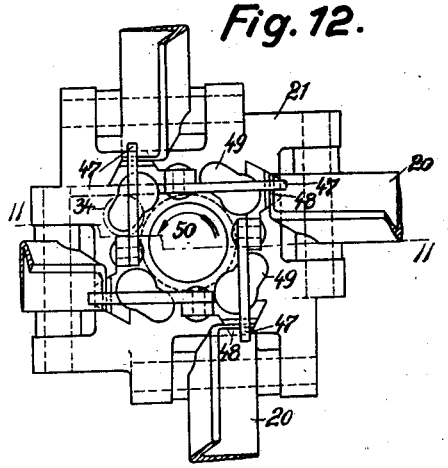
Fig. 12 is a detail elevation of the same.
Figure 11:
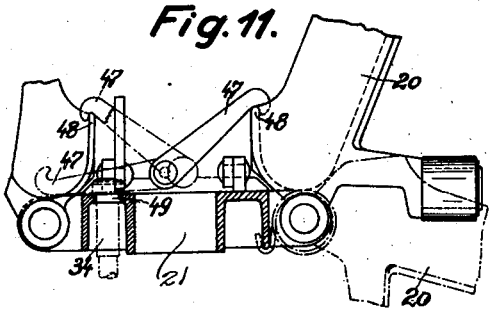
Fig. 11 is a detail vertical sectional view of the mechanism for locking the rake bars in upwardly swung position which they assume when the machine is being removed, taken on the plane indicated by the line 11—11 of Fig. 12.

When the machine is to be put out of service and removed the grain delivery mechanism must be removed from its operating position so as to enable the platform to be swung upward. The arrangement of the parts is such that the grain delivery mechanism can be easily displaced for this purpose. The rake head 21 with the rakes 20 can be lifted off the top of the vertical support 18 after the bolts 34 have been removed, and the support with the other parts of the grain delivery mechanism can then also be removed after the driving shaft 22 has been disconnected. To thus remove the delivery mechanism the rakes 20 are all swung round their pivots into their highest position, see Fig. 11. In these positions they are locked by hooks 47 which engage with edges 48 at the inner ends of the rake bar as shown in Fig. 11. When the machine is in its operative position the backs of these hooks lie on the rake head in the position shown in Fig. 11. In this position one of their sides or cheeks lies against the peripheries of the heads of the bolts 34 so as to prevent these bolts from turning or shifting in the openings 49 in the rake head. The rake head is thus prevented from disengaging itself from the bolts 34 by which it is held to the bevel wheel 25. The holes 49 in the rake head have the shape of keyholes, see Fig. 12. The heads of the bolts 34 and the openings 49 thus form a kind of bayonet socket joint. By turning the rake head in the direction of the arrow 50 (Fig. 12) the heads of the bolts 34 are made to register with the wider portions of the holes 49 and the rake head can then be easily lifted off. It will be apparent that when the hooks are swung into the positions (indicated in Fig. 11 by dash and dot lines for the top hook) in which they lie against sides of the bolt heads 34 they will prevent the bolts from moving into registration with the wider parts of the holes. While the machine is being transported either to work or away from the work, the post 18 together with the parts 20, 21 of the grain delivery mechanism are not in the position shown in Fig. 2 which is the operative position, but the post 18 with the upper parts is lifted from the bearing 16, Fig. 2, and is inserted in the bearing 51ª intended to receive the same, as shown in Fig. 7. If the post 18 together with the grain delivery mechanism would remain in operative relation, as shown in Fig. 2, it would be impossible to fold the cutting devices 10 upward, which relation is necessary when the machine is to be transported to work or from work. The rake head 21, with the rakes locked in their uppermost position, is mounted first on the support 51 and the support 18 is thereupon placed above the rake head. After the grain delivery mechanism has thus been placed in the position for transport of the harvesting machine the platform 10 can be swung upward in the ordinary manner as indicated in Fig. 7. To convert the aforedescribed grain mower into a grass-mower for the hay-making season it is only necessary to execute a few manipulations which are easily performed. The machine converted into a grass mower is shown in Figs. 4, 5 and 6. To effect this conversion the following parts are removed from the grain cutting machine: The platform 10 with the cutter bar 11 is disconnected from the connecting member 13 by removal of the hinge bolts 12, after previously removing the grain delivery mechanism and the pillar or vertical support 18, which can be readily done on account of the aforedescribed construction of these parts. The grain delivery mechanism is arranged in sets of parts which are taken off together, the one set comprising the rake head 21 with the associated rakes 20. To separate the grain delivery mechanism from its drive it is only necessary to impart a slight turn to the sleeve 26 in the opposite direction to that in which it turns when driving the said mechanism. As shown in Figs. 15 and 16, a pin 52 of the shaft section 22″ engages a bayonet slot 53 of the sleeve 26. When this sleeve is turned, the pin 52 enters the longitudinal or axial part of the bayonet slot, as indicated at 53, so that the section 22″ of the shaft may be withdrawn from the sleeve. The shaft stump 6 with the supporting arm 8 for the driver's seat is then also removed by unscrewing the bolts 54. The shaft stump is joined for grass-mowing to the opposite end of the shaft-coupling beam 5 indicated in Fig. 4. The driver's seat 9 and its support are fixed in a holder 55 attached to the axle of the vehicle and the cutter bar 56 is connected by hinge bolts 12 to the connecting member 13 in a manner similar to that in which the grain cutter bar and grain platform were connected, except that for grass-mowing the fingers of the cutter bar are turned in the opposite direction. The cutter bar is connected in the customary manner with the lifting device 57 and the rocking device 58.

It is thus seen that when the machine is used for mowing grass it is pulled in the oposite direction to that in which it is drawn when used for cutting grain. The shaft-coupling beam 5 is provided with a wheel 5′ that is capable of turning round a vertical axis. When the machine acts as a grass mower the wheel 5′ supports the shaft 5, but when the machine is used for cutting grain the said wheel 5′ takes the weight of the cutter bar and the platform and the other associated mechanism. In mowing grass the cutter bar is arranged in front of the wheels 1 and 2 as indicated in dotted lines in Fig. 4, while in mowing grain the cutting mechanism is arranged in the rear of the wheels 1, 2 as shown in Figs. 1 and 3.

Figure 14:
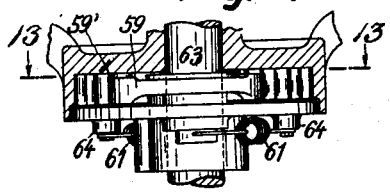
Fig. 14 is a detail elevation of the same partly in section on the line 14—14 of Fig. 13.

As rotary motion is transmitted from the vehicle wheels to the driving shaft by pawls which exert a turning effect in one direction only, and are ineffective when the rotation of the vehicle wheel is reversed, it is necessary, when converting the machine, to reverse the action of the pawls, as otherwise they would exert no turning effect on the driving shaft of the mowing mechanism when the vehicle is drawn in the reverse direction in mowing grass. To this end the pawls 59 (Figs. 13 and 14) are provided with two arms. When the vehicle wheels rotate in the direction indicated by the arrow 60 in Fig. 13, as in cutting grain for example, the one arm of each pawl 59 is pulled by a spring 61 into a position in which its end 59' engages with the internal toothed gear 62 of the vehicle wheel so that the axle or driving shaft 63 is carried round by the pawls in the direction of the arrow 60, while rotation of the vehicle wheel in the opposite direction will only result in the internal teeth 62 slipping past the ends 59' of the pawls. When the pawls are reversed, in converting the machine, the springs 61 are unhooked from the pawls and these latter are swung round on their attaching studs 64 to the position indicated at 61ª so as to cause their other ends 59'' to engage with the internal teeth 62. The springs 61 are then attached in such a manner that they tend to turn the ends 59'' of the pawls towards the internal teeth.

To reconvert the grass mower into a grain mower the described operations are performed in the reversed order.

I claim:—

1. A convertible mower comprising cutter mechanism, a grain delivery mechanism, a grain platform, a vehicle frame, a vertical support for the grain delivery mechanism, and a supporting member with a pivot element between its two ends by which it is connected to the vehicle frame, the said platform resting on the said supporting member on one side of the said pivot element and the said vertical support resting on the supporting member at the other side of the pivot element.

2. A convertible mower comprising cutter mechanism, a grain delivery mechanism, a grain platform, a vehicle frame, a vertical support for the grain delivery mechanism, and a supporting member with a pivot element between its two ends by which it is connected to the vehicle frame, the said platform resting on the said supporting member at one side of the said pivot element and the said vertical support being detachably mounted on the supporting member at the other side of the pivot element.

3. In a convertible mower; cutter mechanism for grain and grass cutting; a grain delivery mechanism comprising separately detachable sets of cooperating parts; a grain platform; a vehicle frame; a vertical support for the grain delivery mechanism; and a supporting member with a pivot element between its two ends by which it is connected to the vehicle frame, the said platform resting on the said supporting member at one side of the said pivot element and the said vertical support resting on the supporting member at the other side of the pivot element.

4. In a convertible mower; cutter mechanism; a vehicle frame; a supporting member with a pivot element between its two ends by which it is connected to the vehicle frame, a grain platform resting on the said supporting member at one side of the said pivot element and a vertical support resting on the supporting member at the other side of the pivot element; and a grain delivery mechanism comprising separately detachable sets of cooperating parts, one set of the said cooperating parts comprising rakes and a rake revolving member journalled at the top end of the said vertical support and provided with openings which are narrowed at one end, a wheel for driving the rake revolving member journalled beneath this member on the vertical support, and bolts fixed in the said driving wheel and having heads which can pass through the large parts of the said openings and extend beyond both edges of the narrow parts of the said openings.

5. In a convertible mower; cutter mechanism; a vehicle frame; a suppporting member with a pivot element between its two ends by which it is connected to the vehicle frame; a grain platform resting on the said supporting member at one side of the said pivot element and a vertical support resting on the supporting member at the other side of the pivot element; and a grain delivery mechanism comprising separately detachable sets of cooperating parts, one set of the said cooperating parts comprising rakes and a rake revolving member journalled at the top end of the said vertical support and provided with openings which are narrowed at one end, a wheel for driving the rake revolving member journalled beneath this member on the vertical support, bolts fixed in the said driving wheel and having heads which can pass through the large parts of the said openings and extend beyond both edges of the narrow parts of the said openings, and a driving shaft for rotating the said driving wheel, said shaft consisting of two sections joined by a sleeve with a bayonet socket forming a separable connection with one of said sections.

6. In a convertible mower; cutter mechanism; a vehicle frame; a supporting member with a pivot element between its two ends by which it is connected to the vehicle frame; a grain platform resting on the said supporting member at one side of the said pivot element and a vertical support resting on the supporting member at the other side of the pivot element; and a grain delivery mechanism comprising separately detachable sets of cooperating parts, one set of the said cooperating parts comprising a rake revolving member journalled at the top end of the said vertical support and provided with openings which are narrowed at one end, swinging rakes attached by substantially horizontal pivots to the rake revolving member, and hinged hooks for holding the rakes in upwardly swung positions; another said set comprising a wheel for driving the rake revolving member journalled beneath this member on the said vertical support and bolts fixed in the said driving wheel and having heads which can pass through the large parts of the said openings and extend beyond both edges of the narrow parts of the said openings, the said hooks being adapted, when swung into a position in which they do not hold the rakes, to abut against the sides of the said bolt heads, whereby the bolts are prevented from moving in the said openings.

7. In a convertible mower; cutter mechanism; a vehicle frame; a supporting member with a pivot element between its two ends by which it is connected to the vehicle frame; a grain platform resting on the said supporting member at one side of the said pivot element and a vertical support resting on the supporting member at the other side of the said pivot element; and a grain delivery mechanism comprising separately detachable sets of cooperating parts, one set of the said cooperating parts comprising a rake revolving member journalled at the top end of said vertical support and provided with openings which are narrowed at one end and swinging rakes attached by horizontal pivots to the rake revolving member; another said set comprising a wheel for driving the rake revolving member journalled beneath the rake revolving member on the said vertical support, bolts fixed in the said driving wheel and having heads which can pass through the large parts of the said openings and extend beyond both edges of the narrow parts of the said openings, a cam for swinging the revolving rakes up and down, a bevel wheel for rotating the said driving wheel, and a bevel wheel shaft journalled in the body of the said cam.

8. A convertible mower comprising cutter mechanism, a grain delivering mechanism, a grain platform, a vehicle frame mounted on an axle with two wheels, a shaft coupling beam with two ends to either of which a vehicle shaft may be attached, cutter driving gear, connecting members for connecting the cutter driving gear to the cutter mechanism, said connecting members being in line with one of the said wheels, and a supporting wheel for supporting the shaft coupling beam at the end which is further away from the said axle than the said connecting members.

9. A convertible mower comprising cutter mechanism, a grain delivering mechanism, a grain platform, a vehicle frame mounted on an axle with two wheels, a shaft coupling beam with two ends to either of which a vehicle shaft may be attached, cutter driving gear, connecting members for connecting the cutter driving gear to the cutter mechanism, said connecting members being in line with one of the said wheels, a supporting wheel for supporting the shaft coupling beam at the end which is further away from the said axle than the said connecting members, a driving shaft for driving the said cutter driving gear and grain delivery mechanism, a toothed wheel for rotating the driving shaft and reversible pawls which in each of their two positions transmit rotary motion of only one direction from a vehicle wheel to the said toothed wheel.

10. A combined grain and grass mower comprising a two-wheeled vehicle, a cutter mechanism, driving gear for the cutter mechanism, a grain platform, a detachable grain delivery mechanism, a shaft coupling beam, a bar attachable to either end of the said beam, a driver's seat, means for permitting the driver's seat to be attached to two different parts of the vehicle, a detachable drive for driving the grain delivery mechanism, and a support on the vehicle frame for supporting the grain delivery mechanism when detached from its drive and placed in non-operative position.

In testimony whereof I affix my signature.

JOHANN HEINRICH FAHR.